(12) United States Patent
Froggatt (10) Patent No.: US 9,778,137 B2
(45) Date of Patent: Oct. 3, 2017

(54) METHODS AND APPARATUS FOR MEASUREMENT OF MODAL CHARACTERISTICS OF MULTIMODE FIBER USING RAYLEIGH SCATTER

(71) Applicant: INTUITIVE SURGICAL OPERATIONS INC., Sunnyvale, CA (US)

(72) Inventor: Mark E. Froggatt, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 70 days.

(21) Appl. No.: 14/778,195

(22) PCT Filed: Mar. 18, 2014

(86) PCT No.: PCT/US2014/030946
§ 371 (c)(1),
(2) Date: Sep. 18, 2015

(87) PCT Pub. No.: WO2014/153306
PCT Pub. Date: Sep. 25, 2014

(65) Prior Publication Data
US 2016/0258839 A1    Sep. 8, 2016

Related U.S. Application Data

(60) Provisional application No. 61/803,187, filed on Mar. 19, 2013.

(51) Int. Cl.
| | | |
|---|---|---|
| *G01N 21/00* | (2006.01) | |
| *G01M 11/00* | (2006.01) | |
| *G02B 6/028* | (2006.01) | |

(52) U.S. Cl.
CPC ....... *G01M 11/3172* (2013.01); *G02B 6/0288* (2013.01)

(58) Field of Classification Search
CPC ...... G01J 9/02; G01M 11/00; G01M 11/3172; G01N 21/00; G01N 21/47; G01B 9/02;
(Continued)

(56) References Cited

U.S. PATENT DOCUMENTS

| 5,708,500 A | 1/1998 | Anderson |
| 6,930,768 B2 | 8/2005 | Ingles, Jr. et al. |

(Continued)

OTHER PUBLICATIONS

Written Opinion for Application No. PCT/US2014/030946, mailed on Aug. 4, 2014, 4 pages.
(Continued)

*Primary Examiner* — Jamil Ahmed
(74) *Attorney, Agent, or Firm* — Nixon & Vanderhye P.C.

(57) ABSTRACT

One or more modal characteristics are determined for a waveguide that supports more than two modes. In an example implementation, optical frequency domain reflectometry (OFDR) is used to couple light into the waveguide and detect Rayleigh scatter reflections associated with a segment of the waveguide. An original set of Rayleigh scatter data associated with the detected Rayleigh scatter reflections is generated. In addition, a scaled set of Rayleigh scatter data associated with the detected Rayleigh scatter reflections is generated. The original set of Rayleigh scatter data is correlated with the scaled set of Rayleigh scatter data. One or more modal characteristics of the waveguide are determined based on the correlation.

16 Claims, 10 Drawing Sheets

(58) Field of Classification Search
CPC .......... G02B 6/0288; G02B 6/00; G02B 6/14; G01K 11/32
See application file for complete search history.

(56) References Cited

U.S. PATENT DOCUMENTS

| | | |
|---|---|---|
| 7,221,439 B2 | 5/2007 | Chen et al. |
| 7,330,245 B2 | 2/2008 | Froggatt |
| 2004/0046955 A1 | 3/2004 | Fayolle et al. |
| 2006/0204165 A1* | 9/2006 | Froggatt ................ G01K 11/32 385/12 |
| 2010/0290738 A1* | 11/2010 | Yan .......................... G02B 6/14 385/28 |

OTHER PUBLICATIONS

International Search Report for PCT/US2014/030946, mailed Aug. 4, 2014, 2 pages.

\* cited by examiner

METHODS AND APPARATUS FOR MEASUREMENT OF MODAL CHARACTERISTICS OF MULTIMODE FIBER USING RAYLEIGH SCATTER

PRIORITY APPLICATION

This application is the U.S. national phase of International Application No. PCT/US2014/030946 filed Mar. 18, 2014 which designated the U.S. and claims priority to U.S. provisional patent application 61/803,187, filed on Mar. 19, 2013, the contents of each of which are incorporated herein by reference.

TECHNICAL FIELD

The technology in this application relates to optical measurement apparatus and techniques.

BACKGROUND

Multimode optical fiber is used in a wide variety of short range (<100 m) communications applications. The design of these fibers is increasingly specialized, and there is demand for higher bandwidth communications over longer ranges. Two quantities of interest in multimode fibers are modal dispersion, which is a measure of the relative speeds of the modes in the fibers, and modal spacing, which is a measure of the relative wavelengths of the modes in the fiber. The relative speeds of the modes in the fiber are characterized by a quantity called the relative group-index, and the relative wavelengths of the modes are characterized by a quantity called the relative effective-index. These two relative index values are important fiber design parameters, but they are difficult to determine and have largely been theoretical in nature.

In U.S. Pat. No. 7,330,245, the inventor describes how to measure the relative group index and effective-index of the two modes propagating in Polarization Maintaining (PM) fiber. In the case of PM fiber, the two modes have the same distribution and occupy the same space but have different polarizations. In contrast, the modes in a multimode fiber occupy the same space, but their distributions in this space differ significantly and are orthogonal functions. As a result, it has been assumed that different modes in multimode fiber would have different uncorrelated Rayleigh scatter patterns because the scatter centers are assumed to be distributed three dimensionally through the core. Given these assumptions, the expectation has been that cross correlations of the Rayleigh scatter patterns for the different modes in the multimode fiber would not provide useful results. Another concern is Rayleigh scatter measurements from multimode fiber are weaker (lower amplitude) than those from single mode fiber or PM fiber. Consequently, short segment Rayleigh scatter data correlations typically used for PM fiber produce low level peaks when used for multimode fiber, which makes analysis of correlations for multimode fiber difficult.

SUMMARY

The inventor discovered that the conventional assumptions regarding modes in multimode fiber described above were not true. Contrary to conventional expectations, the inventor developed OFDR-based technology that measures modal characteristics of multimode fiber using Rayleigh scatter correlation techniques.

More generally, a method and apparatus are described that determine one or more modal characteristics of a waveguide that supports more than two modes. A non-limiting example of such a waveguide is multimode optical fiber. Light is coupled into the waveguide, and Rayleigh scatter reflections associated with a segment of the waveguide are detected. An original set of Rayleigh scatter data associated with the detected Rayleigh scatter reflections is generated. In addition, a scaled set of Rayleigh scatter data associated with the detected Rayleigh scatter reflections is generated. The original set of Rayleigh scatter data is correlated with the scaled set of Rayleigh scatter data. One or more modal characteristics of the waveguide is determined based on the correlation.

In an example implementation, optical frequency domain reflectometry (OFDR) is used to generate and detect the Rayleigh scatter reflections associated with a segment of the waveguide. A length of the segment is preferably sufficiently long to allow two of the modes to accumulate a delay difference equal to or larger than a temporal resolution of the OFDR used to detect the Rayleigh scatter reflections associated with the segment of the waveguide.

In example embodiments, a number of modes supported by the waveguide is determined based on the correlation.

In example embodiments, the waveguide is a multi-mode fiber. Both step-index and graded-index multimode fiber were measured, and the correlation behavior differs based on the fiber type. This differing correlation behavior is then used to determine whether the multi-mode fiber is a step index multi-mode fiber or a graded index multi-mode fiber.

In example embodiments, the original set of Rayleigh scatter data is aligned with the scaled set of Rayleigh scatter data before performing the correlating in order to emphasize one or more cross correlation peaks corresponding to a mode in the multimode fiber.

In example embodiments, a relationship between refractive indices between different modes of light in the waveguide is determined based on the correlation.

In example embodiments, a relationship between group indices between different modes of light in the waveguide is determined based on the scaling.

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not to obscure the description with unnecessary detail. Those skilled in the art will appreciate that the functions described may be implemented in one or more nodes using optical components, electronic components, hardware circuitry (e.g., analog and/or discrete logic gates interconnected to perform a specialized function, ASICs, PLAs, etc.), and/or using software programs and data in conjunction with one or more digital microprocessors or general purpose computers. Moreover, certain aspects of the technology may additionally be considered to be embodied entirely within any form of computer-readable memory, such as solid-state memory, magnetic disk, or optical disk containing an appropriate set of computer instructions that would cause a processor to carry out the techniques described herein.

Hardware implementations of certain aspects of the technology may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The following description applies to any type of wave guide. For simplicity, optical fiber is used as a non-limiting example waveguide. As mentioned in the background, it is advantageous to be able to determine relationships between the modes in multimode optical fiber. The technology in this application uses Optical Frequency Domain Reflectometry (OFDR) to measure distributed Rayleigh scatter from a segment of multimode fiber and uses this Rayleigh scatter pattern to characterize the relationships between the modes in that segment of multimode fiber. In particular, the effective index difference between modes and the group index difference between modes are measured. Non-limiting examples are provided for two types of multimode fiber: graded index and step index multimode fiber.

Figure 1:
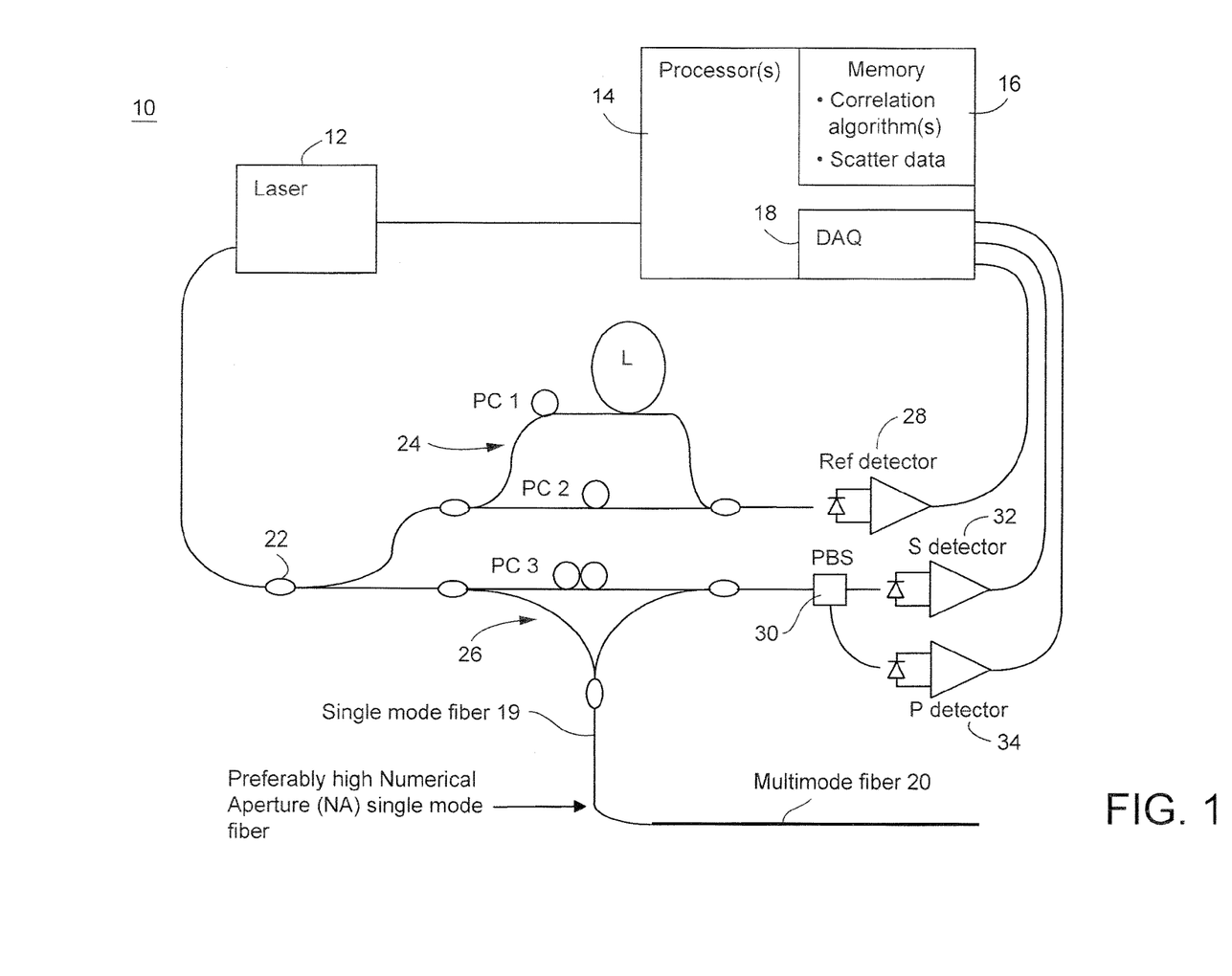
FIG. 1 shows a non-limiting example OFDR system that may be used to measure modal characteristics of multimode fiber using Rayleigh scatter.

FIG. 1 shows an example OFDR system 10 connected to a single mode fiber 19 that is then connected to a multi-mode fiber 20. An OFDR system 10 includes a tunable light source 12, an optical network that includes a measurement interferometer 26 and possibly a monitor interferometer 24, a Rayleigh scatter data acquisition (DAQ) system 18, a system controller 14 including one or more microprocessors for performing processing of Rayleigh scatter data stored in memory 16 along with various processing programs including one or more correlation algorithms. The system controller 14 initiates the sweep of the tunable laser source 12 over an optical frequency range. The light is split between the laser monitor optics 24 and measurement optics 26. The laser monitor optics 24 typically includes an absolute wavelength reference (though not shown in FIG. 1) and a relative phase monitor. In a typical reflection OFDR measurement, the light input to the measurement interferometer 26 is split between a reference path and a device under test (DUT), in this case a multimode fiber 20. Reflected light from the DUT comes back through the same path used to inject light into the DUT. In a simple example embodiment of a transmission OFDR instrument, the light input to the measurement interferometer is split between a reference path and the DUT, and the light comes back into the measurement interferometer through an output port of the device. In both receive (Rx) and transmit (Tx) type OFDR measurements, the light from the reference path and the light that traverses the DUT 20 is interfered, and the interferogram is split by a polarization beam splitter (PBS) 30 and then detected by photo-sensitive s and p detectors 32 and 34. The interferograms are converted by the DAQ 18 into electronic signals representing detected Rayleigh scatter from the DUT 20, and the signals from the laser monitor 24 detected at 28 are used by the system controller 14 to resample the measured Rayleigh scatter signals to equal optical frequency increments. Signals from an absolute wavelength reference (not shown in FIG. 1) are used to spectrally register the acquired data as a function of absolute optical frequency. The system controller 14 Fourier Transforms the resampled data into the temporal domain for filtering and time domain response analysis such as, for example, determination of return loss, group delay, birefringence, beat length, polarization extinction ratio, and optical phase versus delay down the device, and/or construction of the device Jones Matrix. The measurement data may then be Fourier Transformed back to the optical frequency domain for optical frequency domain analysis to determine, for example: insertion loss, phase, group delay, chromatic dispersion, polarization dependent loss, differential group delay, versus optical frequency or wavelength.

Figure 2:
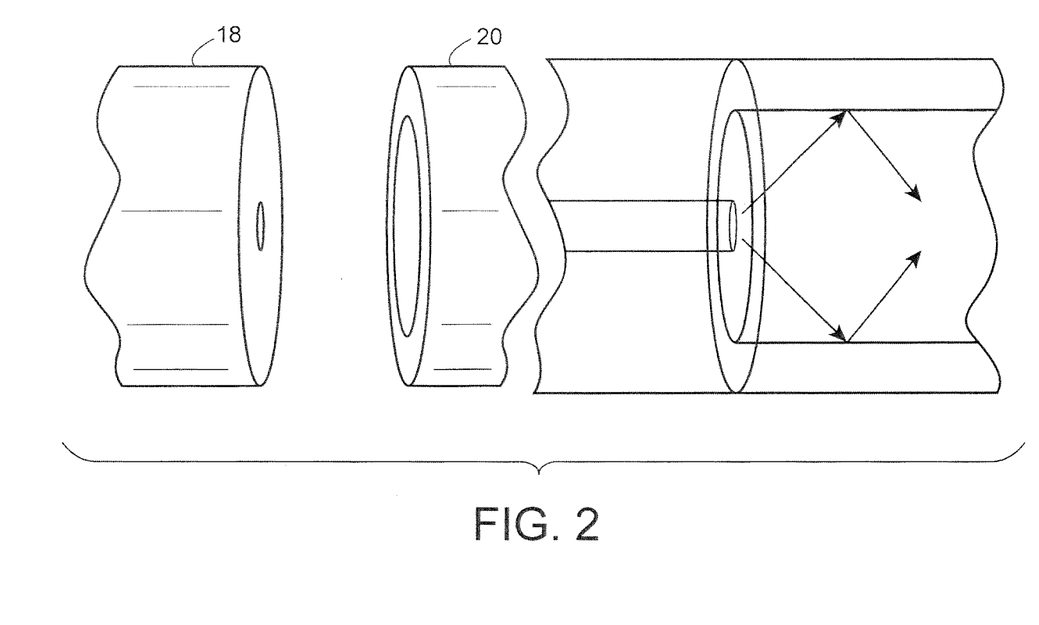
FIG. 2 shows an example coupling between a single mode fiber and a multimode fiber.

FIG. 2 shows an example connection of a single-mode fiber 18 to a multi-mode fiber 20, and the launching of light into the multimode fiber 20. The single mode fiber is connected to the multimode fiber using a connector or a fiber-optic splice. The splice is done such that the smaller core of the single mode fiber is positioned near the center of larger core of the multi-mode fiber. The complex reflection (Rayleigh scatter or simply scatter) as a function of distance along this combined fiber is then measured using the OFDR system 10.

Figure 3:
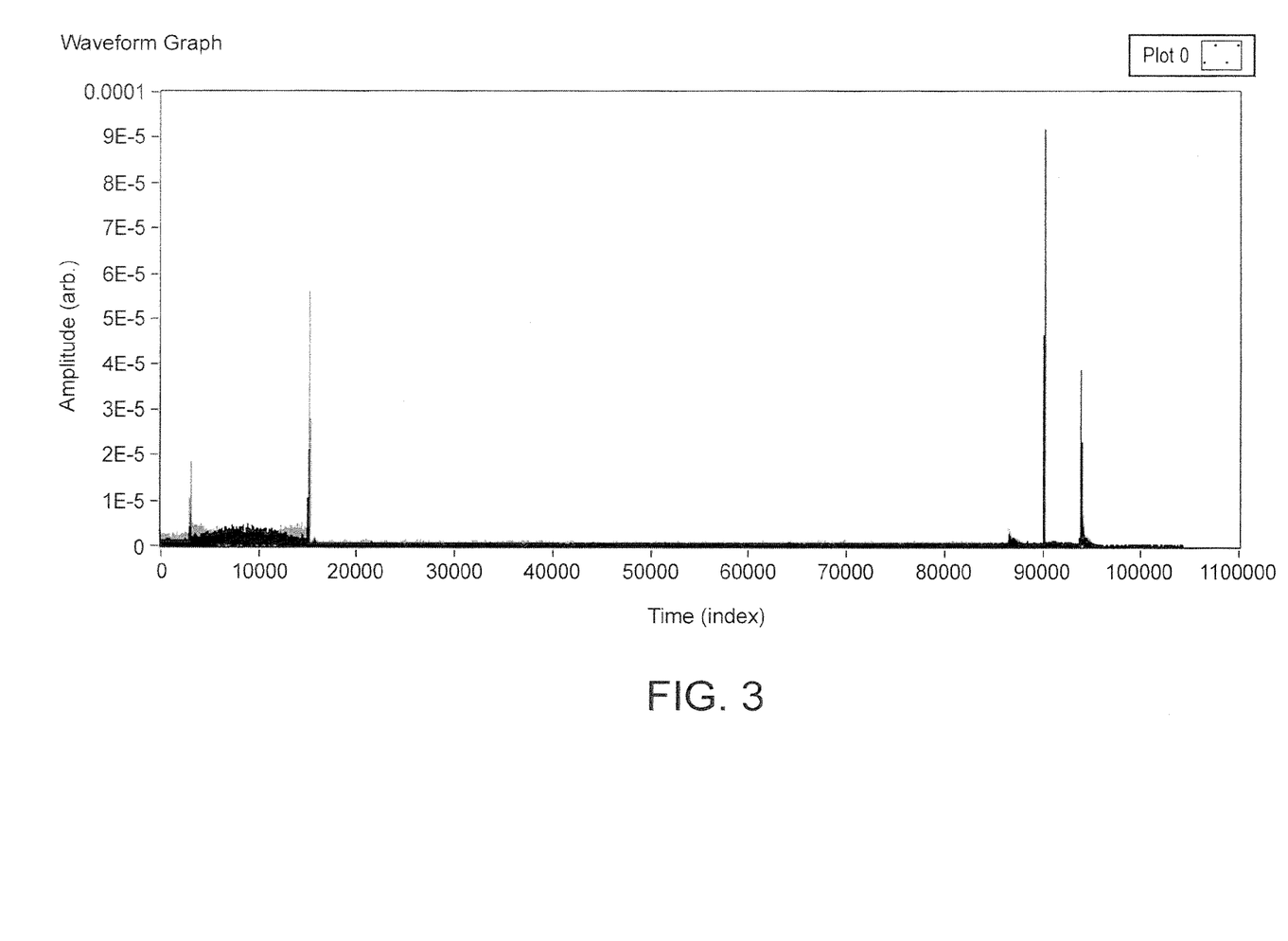
FIG. 3 is a plot showing example amplitude of Rayleigh scatter as a function of time-delay from a coupled single mode-multimode fiber such as that shown in FIG. 2.
Figure 4:
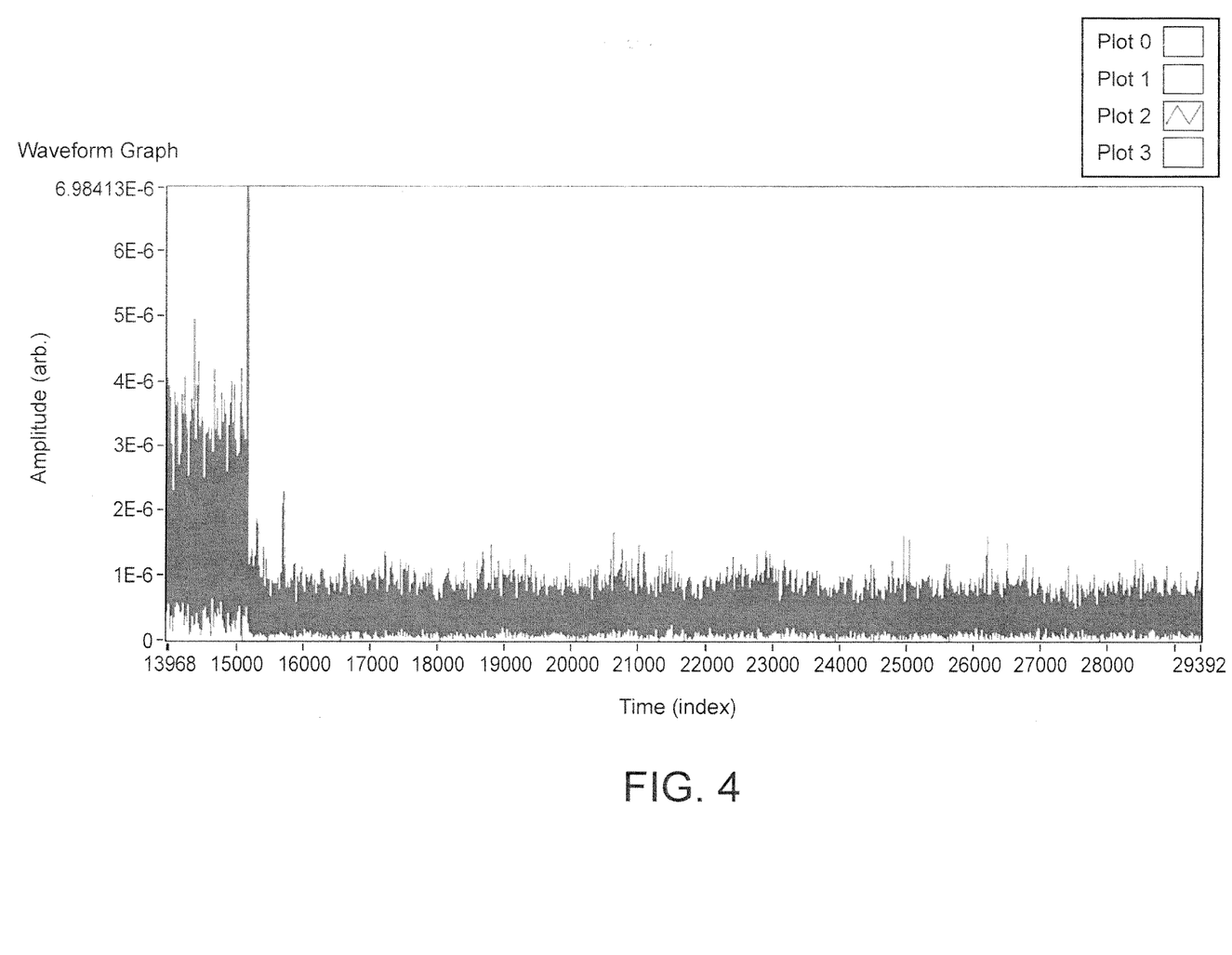
FIG. 4 is a plot showing an example of zoomed in amplitude of Rayleigh scatter as a function of time-delay at the connection point between the single mode and multi-mode fiber from FIG. 3.

FIG. 3 is a plot showing an example Rayleigh scatter amplitude produced from distributed scan of the tunable laser as a function of time-delay from a coupled single mode-multimode fiber such as that shown in FIG. 2. A reflection around 15000 indices shows where the single mode fiber 19 connects to the multimode fiber 20. The Rayleigh scatter from the multimode fiber 20 extends from 15000 to about 90,000 indices. FIG. 4 shows a zoomed-in view of the Rayleigh scatter at the connection point to the multimode fiber 20.

A segment of the Rayleigh scatter data associated with the multimode fiber is selected from index 16000 to 26000 indices, and the system controller 14 performs an inverse Fourier transform the detected Rayleigh scatter data to produce the spectrum of that segment of the fiber. The Fourier transform is preferably performed on the full complex data set (amplitude and phase) of the multimode Rayleigh scatter measurement rather than just the amplitude data to produce multimode Rayleigh scatter data in the spectral domain.

Figure 5:
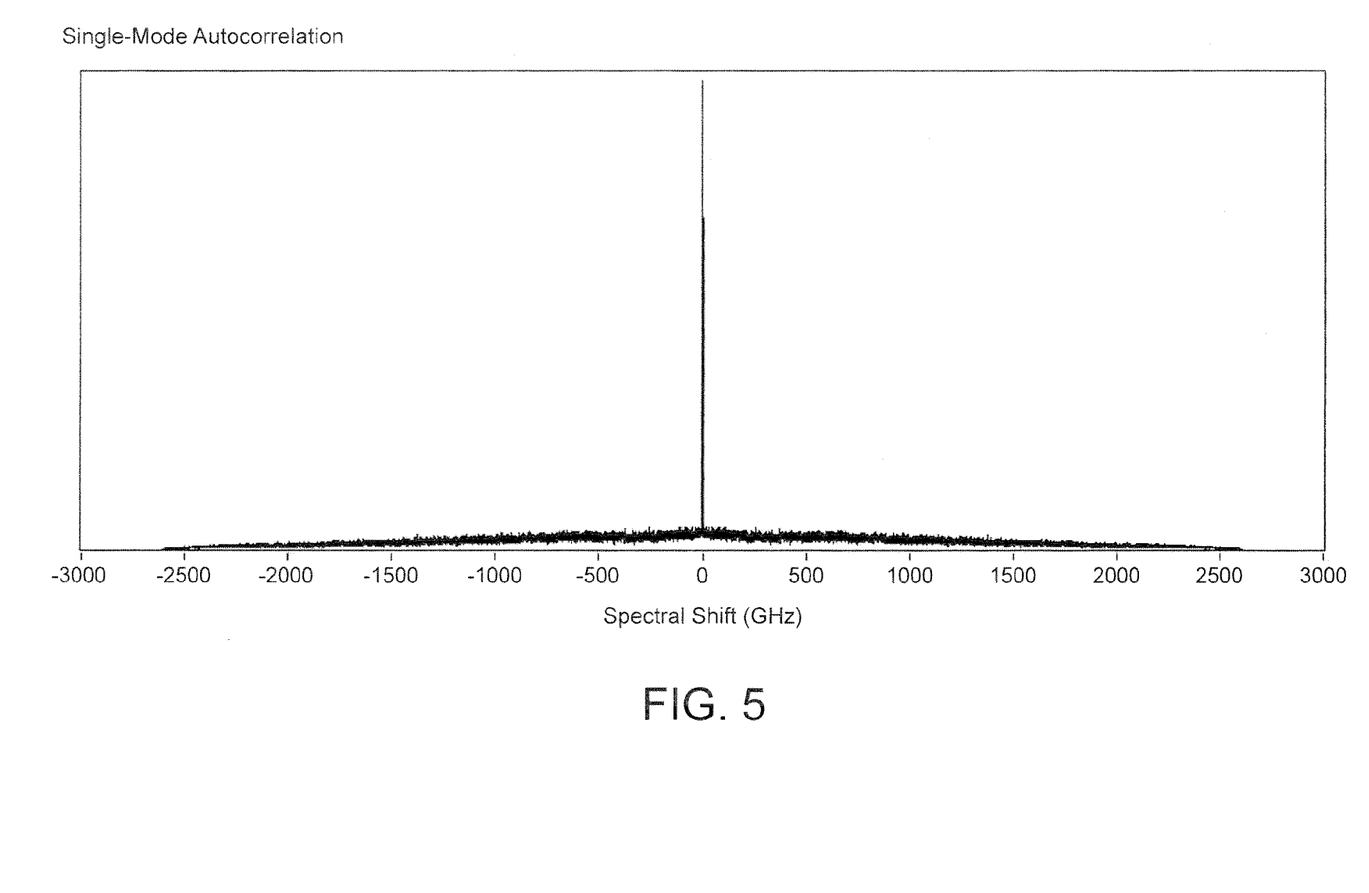
FIG. 5 is a plot showing an example autocorrelation of amplitude of Rayleigh scatter as a function of spectral-shift for single mode fiber.

The system controller 14 may autocorrelate (correlate the data with a copy of that data) spectral domain Rayleigh scatter data. FIG. 5 is a plot showing an example autocorrelation of amplitude of Rayleigh scatter as a function of time-delay for single mode fiber. There are no side peaks in this complex autocorrelation for single mode fiber.

Figure 6:
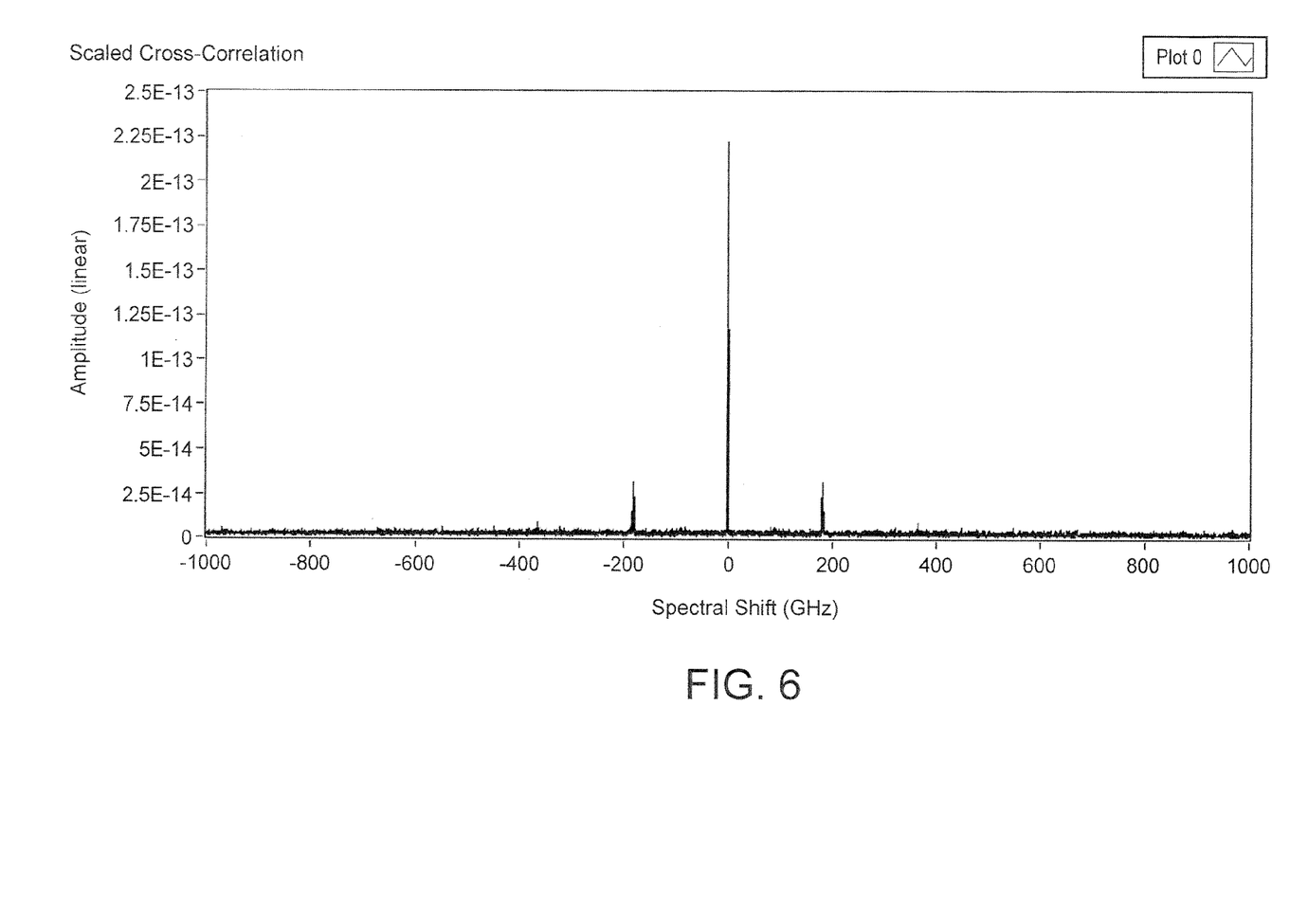
FIG. 6 is a plot showing an example autocorrelation of amplitude of Rayleigh scatter as a function of spectral shift for a multimode mode fiber.
Figure 7:
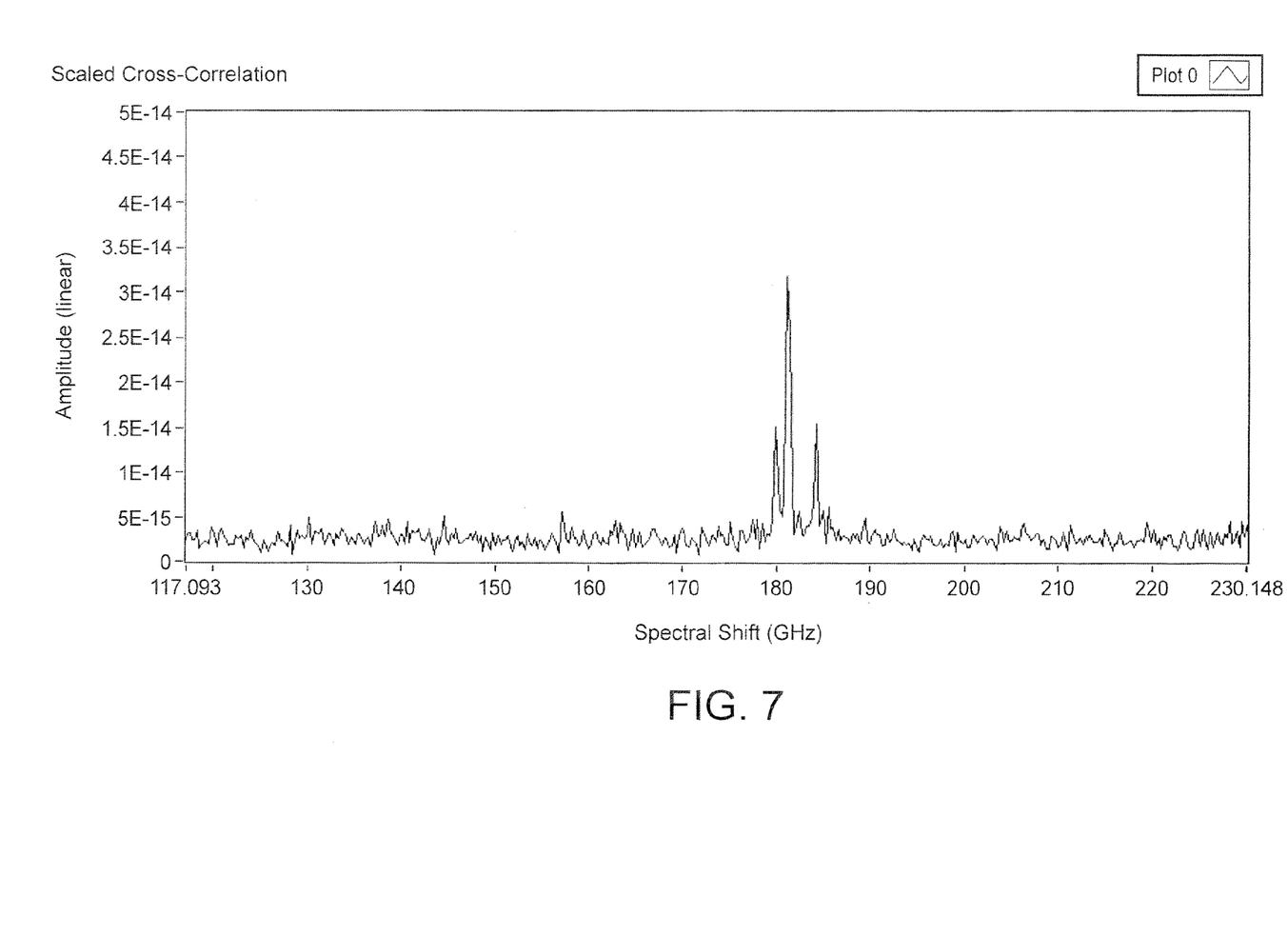
FIG. 7 is a plot showing an example of zoomed in amplitude of the autocorrelation of Rayleigh scatter as a function of spectral shift of the first modal peak shown in FIG. 6.

However, when an autocorrelation is performed on the complex valued spectrum of a segment of the time-domain Rayleigh scatter from an example step-index multimode fiber, the plot of the amplitude of the spectral autocorrelation data shown in FIG. 6 is produced. There are several peaks present in each side band group indicating that a set of closely-spaced modes were propagating in the fiber. The location of these sidebands provides a measure of the difference of the effective index of each of the modes in this mode group. FIG. 7 is a plot showing an example of zoomed-in amplitude of Rayleigh scatter as a function of time-delay of the first modal peak shown in FIG. 6.

In order to address the problem of lower signal level for detected Rayleigh scatter associated with each mode in a multimode fiber, the Rayleigh scatter signal from a longer segment of fiber is detected. A larger segment size provides more independent data points, and these independent points effectively allow more averaging to take place in the cross correlation. However, if the Rayleigh scatter detection provides higher quality data, and shorter segment lengths can be used.

The delay difference for each modal peak is accumulated due to the differential group delays between the modes. In the non-limiting example in FIG. 6, twenty thousand points from a 0.8 meter segment of the fiber were used for the correlation. With a differential group index of 1.00078, this amounts to $(0.000078) \times (20,000) = 1.5$ points of accumulated delay difference.

The lower signal level problem is also overcome by processing the detected Rayleigh scatter data using a complex cross correlation instead of an autocorrelation. In fact, if the modes have different group indices, an autocorrelation (i.e., a cross correlation of a signal with itself) does not produce the characteristic "side peaks" that occur when different modes have scattered off of the same scatterers. This is because the different modes have different scales in distance because their velocities are different. Such differing scales/velocities are most evident in the correlation peaks occurring at large spectral shifts in step index fiber. However, the multimode Rayleigh scatter data may be (re)scaled by resampling it at a slightly different but still constant interval. The scaled Rayleigh scatter data is then cross-correlated with the original Rayleigh scatter data and the result reveals the side peaks corresponding to the different modes in the multimode fiber.

The separation between peaks in the cross correlation data produces the difference in frequency between when two modes see the same Rayleigh scatter pattern. The relative effective index can then be calculated by taking the ratio of the two frequencies. The center wavelength of the OFDR laser scan is known. The inverse of the center wavelength provides the center frequency ν of the OFDR laser scan. By adding the difference in frequency between the modes, Δ, to the center frequency ν and dividing that by the center frequency ν, the relative effective index is determined:

$$\frac{n_1}{n_0} = \frac{v + \Delta v}{v}$$

Δν is the location of the side-peak. Using the example in FIGS. 6 and 7 above, the relative effective index for the step index multimode fiber is determined as follows:

$$\frac{n_1}{n_0} = \frac{(193,828 \text{ GHz}) + (181.5 \text{ GHz})}{(193,828 \text{ GHz})} = 1.00094$$

Each mode propagating in a fiber has a distinct effective index that describes the speed at which wave fronts move down the core of the fiber. Each mode also has a distinct group index which describes the speed at which the energy in the light actually moves along the fiber length. These two speeds can differ significantly for modes in a multimode fiber. Different group indices mean that a particular Rayleigh scattering event will occur at a different delay for each of the modes. If the Rayleigh scatter signal is scaled by the ratio of the speed of a faster mode to a slower mode, the two different modes may be aligned.

Figure 8:
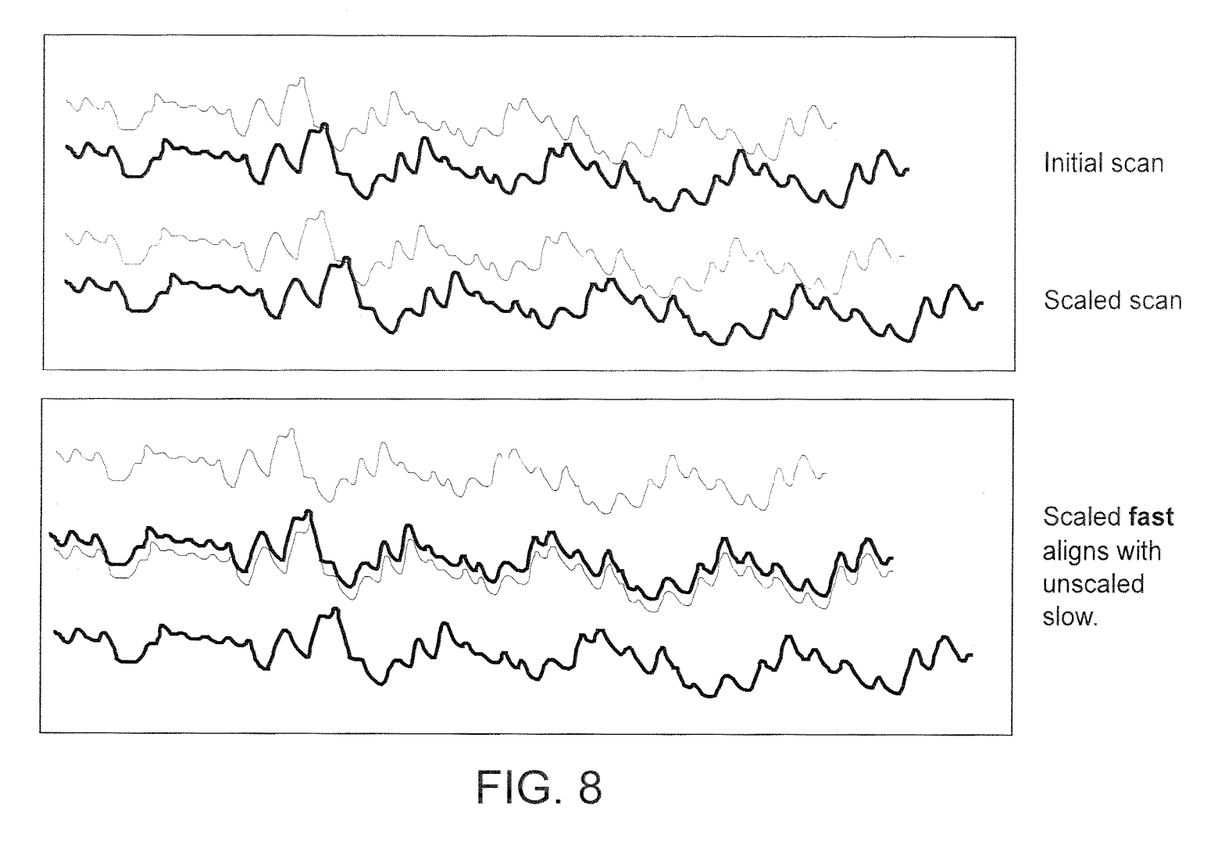
FIG. 8 are plots showing an example of Rayleigh scatter as a function of time-delay for an initial OFDR scan of multimode fiber, a scaled version of that Rayleigh scatter, and then a comparison of the scaled version of the Rayleigh scatter aligned with the initial Rayleigh scatter.

FIG. 8 includes plots showing an example of Rayleigh scatter as a function of time-delay for an initial OFDR scan of multimode fiber, a scaled version of that Rayleigh scatter, and then a comparison of the scaled version of the Rayleigh scatter aligned with the initial Rayleigh scatter. In particular, these waveforms illustrate how a "stretching" type scaling of the Rayleigh scatter data signal is used to obtain helpful cross correlations when modes in a multimode optical fiber have different group indices. In practice, the darker and lighter waveform signals are added together in the measured Rayleigh scatter signal, but they are shown separately here for clarity. The bottom in FIG. 8 shows alignment of the fast and slow modes for the scaled and unscaled of the Rayleigh scatter. The group index difference for a particular modal peak is determined by adjusting the scaling factor on the scaled Rayleigh scatter data waveform until the modal peak of interest is maximized. If this is done for the first peak to the right of zero on the plot in FIG. 6, for example, a modified correlation plot is obtained that is not symmetric since the plot is now the result of cross correlating two different functions.

Figure 9:
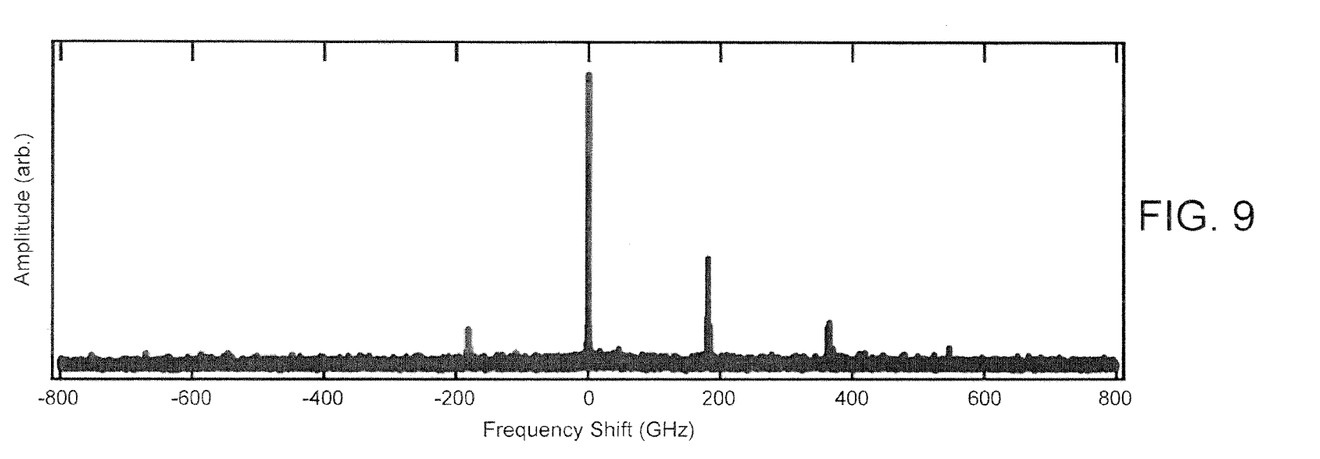
FIG. 9 is a plot showing an example Rayleigh scatter cross correlation from a step index fiber multimode fiber with the scaled Rayleigh scatter data scaled by 1.000078 that shows additional sidebands.

FIG. 9 is a plot showing an example Rayleigh scatter cross correlation from a step index fiber multimode fiber of the original Rayleigh scatter data with the scaled Rayleigh scatter data scaled by 1.000078. When the Rayleigh scatter data for the step index multimode fiber is scaled using a ratio of 1.000078, the cross correlation between the initial and scaled Rayleigh scatter data produces additional sidebands that are now visible. As compared with the autocorrelation shown in FIG. 6, FIG. 9 shows cross correlation peaks at 360 GHz and 550 GHz. This scaling factor maximizes the side peak near 360 GHz. The location of the side peaks provides the relative effective-index of that segment of multimode fiber. The amount of rescaling needed provides its relative group index.

Figure 10:
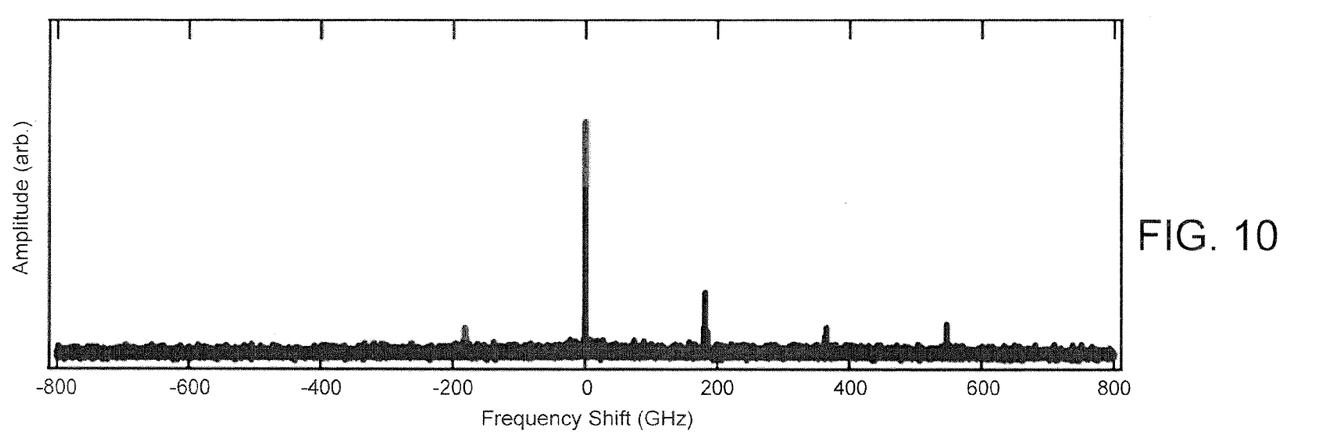
FIG. 10 is a plot showing an example Rayleigh scatter cross correlation from a step index fiber multimode fiber with the scaled Rayleigh scatter data scaled by 1.000110 that shows the largest shift side band maximized.

FIG. 10 shows an example Rayleigh scatter cross correlation from a step index fiber with scaling set to 1.000110. This particular scaling factor produces a cross correlation spectrum with the largest shift side band now maximized, i.e., the peak located near a 550 GHz offset is maximized.

If a graded index fiber is used, then the expectation is that the group index differences will be minimized because graded index fiber is designed specifically to minimize the differences between the group indices of the modes. When the inventor tested graded index multimode fiber, multiple peaks were visible when no scaling was done. Scaling the Rayleigh scatter data before cross correlation for graded index fiber degraded all of the cross correlation peaks. By detecting this degradation for a scaled cross correlation, the system controller can identify a graded index fiber and also distinguish graded index multimode fiber from step index multimode fiber.

Therefore, using a single OFDR scan of a DUT corresponding to a multimode fiber, cross correlation of the original Rayleigh scatter data from a step index fiber multimode fiber with a scaled version of that Rayleigh scatter data permits a determination (1) that the DUT is a multimode fiber, and (2) of the modal spacing in effective index and group index of the modes for the step index multimode fiber.

Figure 11:
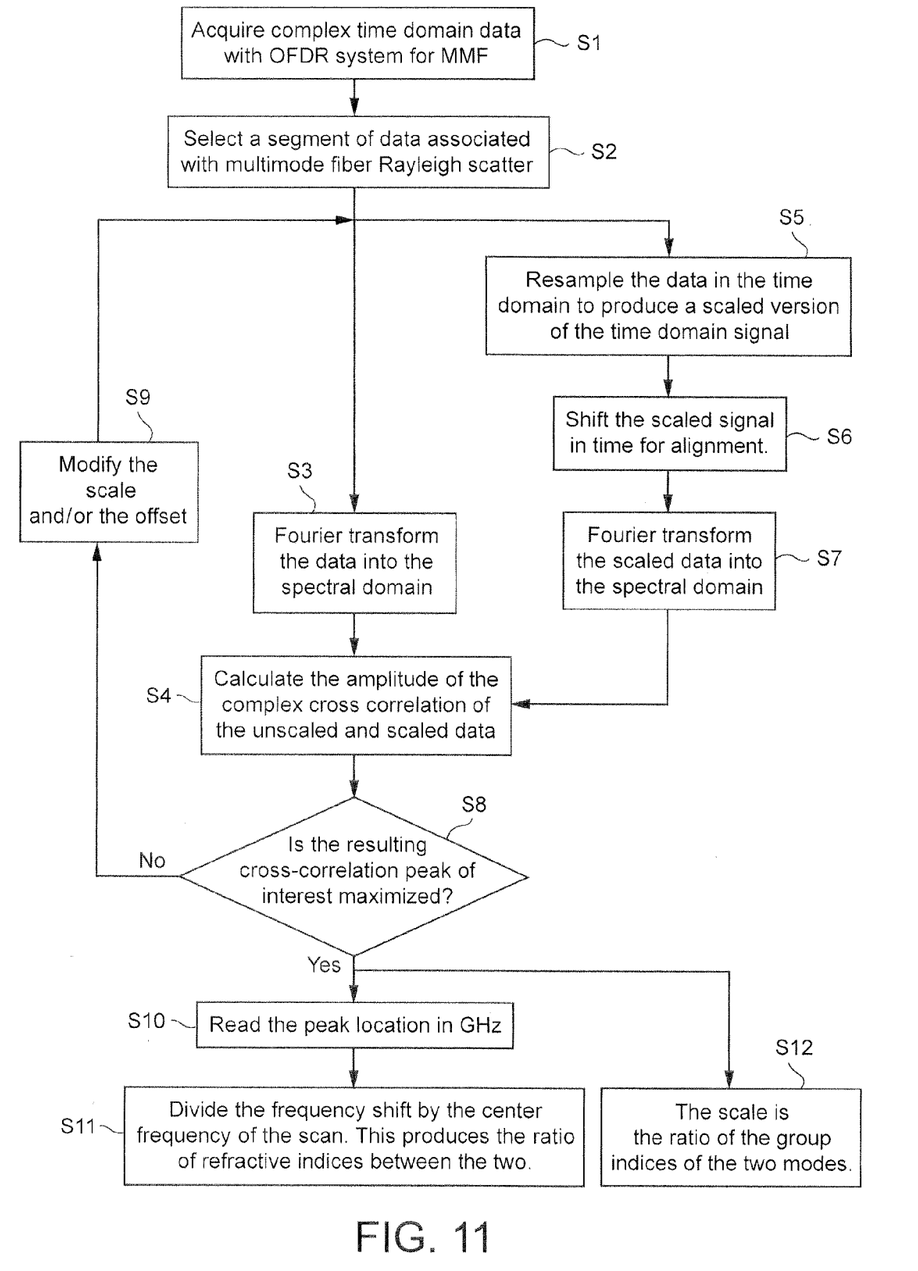
FIG. 11 is a flowchart showing non-limiting example steps implemented by an OFDR system to measure modal characteristics of multimode fiber using cross correlation of scaled and unscaled Rayleigh scatter data.

FIG. 11 is a flowchart showing non-limiting example steps implemented by an OFDR system like that shown in FIG. 1 to measure modal characteristics of multimode fiber using cross correlation of scaled and unscaled Rayleigh scatter data. The processing produces index and group index measurements. The OFDR system acquires complex time domain Rayleigh scatter data for a multimode DUT, e.g., a multimode fiber (step S1). The system controller selects an initial segment of data associated with multimode fiber Rayleigh scatter (step S2) and Fourier transforms that data into the spectral domain (step S3). The system controller also resamples that initial segment of data in the time domain to produce a scaled version of the time domain signal (step S5). It shifts the scaled Rayleigh scatter signal in time for peak alignment (step S6) and Fourier transforms the scaled data into the spectral domain (step S7). The system controller calculates the cross correlation between the aligned initial and scaled Rayleigh scatter data and determines the amplitude of that cross correlation signal (step S4). A determination is made whether a resulting cross correlation peak of interest is substantially maximized (step S8). The scaling corresponds to the ratio of the group indices for the two different detected modes (step S12). The peak location is determined, e.g., as a frequency shift in GHz (step S10), and that frequency shift is divided by the center frequency of the OFDR laser scan. This produces a ratio of effective refractive indices between the two modes (step S11).

Although the description above highlights a small number of modes for ease of description, the technology applies to fibers that guide a large number (e.g., hundreds) as well as a small numbers of modes. (But more than just the two polarization modes typically guided). Such few-mode fibers have significant application in both optical signal processing and optical fiber sensing. Although the relative effective index is an important number for the design of multimode fiber, there currently is no way to determine this without destroying the fiber. These destructive techniques are also tedious and difficult to perform, and, therefore, rarely done. The technology described above makes the measurement of these quantities simple and non-destructive. The technology also may be employed as a distributed measurement.

Although the description above contains many specifics, those specifics should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. A method for determining one or more modal characteristics of a waveguide that supports more than two modes, comprising:
    coupling light into the waveguide that supports more than two modes;
    detecting Rayleigh scatter reflections associated with a segment of the waveguide;
    generating an original set of Rayleigh scatter data associated with the detected Rayleigh scatter reflections;
    generating a scaled set of Rayleigh scatter data associated with the detected Rayleigh scatter reflections;
    cross-correlating the original set of Rayleigh scatter data and the scaled set of Rayleigh scatter data; and
    determining one or more modal characteristics of the waveguide that supports more than two modes based on the cross-correlation.

2. The method in claim 1, wherein the method is implemented using optical frequency domain reflectometry (OFDR).

3. The method in claim 2, wherein a length of the segment is sufficiently long to allow two of the modes to accumulate a delay difference equal to or larger than a temporal resolution of the OFDR used to detect the Rayleigh scatter reflections associated with the segment of the waveguide.

4. The method in claim 1, further comprising determining a number of modes supported by the waveguide based on the cross-correlation.

5. The method in claim 1, wherein the waveguide is a multi-mode fiber, the method further comprising determining if the multi-mode fiber is a step index multi-mode fiber or a graded index multi-mode fiber based on the cross-correlation.

6. The method in claim 1, further comprising aligning the original set of Rayleigh scatter data and the scaled set of Rayleigh scatter data before performing the cross-correlating in order to emphasize one or more cross-correlation peaks corresponding to a mode in the multi-mode fiber.

7. The method in claim 1, further comprising determining a relationship between effective refractive indices between different modes of light in the waveguide based on the cross-correlation.

8. The method in claim 1, further comprising determining a relationship between group indices between different modes of light in the waveguide based on the scaled set of Rayleigh scatter data.

9. An apparatus configured to determine one or more modal characteristics of a waveguide that supports more than two modes, comprising:
- a light source configured to couple light into the waveguide that supports more than two modes;
- optical detection circuitry configured to detect Rayleigh scatter reflections associated with a segment of the waveguide;
- processing circuitry configured to:
  - generate an original set of Rayleigh scatter data associated with the detected Rayleigh scatter reflections;
  - generate a scaled set of Rayleigh scatter data associated with the detected Rayleigh scatter reflections;
  - cross-correlate the original set of Rayleigh scatter data and the scaled set of Rayleigh scatter data; and
  - determine one or more modal characteristics of the waveguide that supports more than two modes based on the cross-correlation.

10. The apparatus in claim 9, wherein the apparatus includes an optical frequency domain reflectometry (OFDR) apparatus.

11. The apparatus in claim 10, wherein a length of the segment is sufficiently long to allow two of the modes to accumulate a delay difference equal to or larger than a temporal resolution of the OFDR apparatus used to detect the Rayleigh scatter reflections associated with the segment of the waveguide.

12. The apparatus in claim 9, wherein the processing circuitry is configured to determine a number of modes supported by the waveguide based on the cross-correlation.

13. The apparatus in claim 9, wherein the waveguide is a multi-mode fiber and the processing circuitry is configured to determine if the multi-mode fiber is a step index multi-mode fiber or a graded index multi-mode fiber based on the cross-correlation.

14. The apparatus in claim 9, wherein the processing circuitry is configured to align the original set of Rayleigh scatter data and the scaled set of Rayleigh scatter data before performing the cross-correlation in order to emphasize one or more cross-correlation peaks corresponding to a mode in the multi-mode fiber.

15. The apparatus in claim 9, wherein the processing circuitry is configured to determine a relationship between refractive indices between different modes of light in the waveguide based on the cross-correlation.

16. The apparatus in claim 9, wherein the processing circuitry is configured to determine a relationship between group indices between different modes of light in the waveguide based on the scaling.

* * * * *